United States Patent
Tumback et al.

(10) Patent No.: US 6,852,054 B2
(45) Date of Patent: Feb. 8, 2005

(54) METHODS FOR OPERATING A MOTOR VEHICLE DRIVEN BY AN INTERNAL COMBUSTION ENGINE AND BY TWO ELECTRICAL MACHINES

(75) Inventors: Stefan Tumback, Stuttgart (DE); Klaus-Peter Schnelle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,101

(22) PCT Filed: Sep. 25, 2001

(86) PCT No.: PCT/DE01/03688

§ 371 (c)(1),
(2), (4) Date: Feb. 28, 2003

(87) PCT Pub. No.: WO02/47931

PCT Pub. Date: Jun. 20, 2002

(65) Prior Publication Data

US 2003/0178953 A1 Sep. 25, 2003

(30) Foreign Application Priority Data

Sep. 25, 2001 (DE) .......................... 100 62 556

(51) Int. Cl.⁷ .............................. B60K 1/00; B60K 6/00; B60K 1/02; F16H 3/72; F16H 37/06
(52) U.S. Cl. ................................. 475/5; 475/151; 477/3; 477/15; 180/65.2
(58) Field of Search .................. 475/5, 8, 151, 475/153; 477/3, 7, 15, 20; 180/65.2–65.3, 65.6–65.7

(56) References Cited

U.S. PATENT DOCUMENTS

| 5,508,574 A | * | 4/1996 | Vlock ..................... 310/113 |
| 5,558,595 A | | 9/1996 | Schmidt |
| 5,935,035 A | | 8/1999 | Schmidt |
| 6,010,422 A | * | 1/2000 | Garnett et al. ................. 475/5 |
| 6,478,705 B1 | * | 11/2002 | Holmes et al. ............... 475/5 |
| 6,558,283 B1 | * | 5/2003 | Schnelle ....................... 475/5 |
| 6,634,247 B2 | * | 10/2003 | Pels et al. .................... 74/329 |

FOREIGN PATENT DOCUMENTS

| DE | 199 03 936 A | 5/2000 | |
| JP | 2000282909 A | * 10/2000 | ........... F02D/29/02 |

* cited by examiner

Primary Examiner—Tisha Lewis
(74) Attorney, Agent, or Firm—Michael J. Striker

(57) ABSTRACT

Two methods for operating a motor vehicle driven by an internal combustion engine (VM) and by two electrical machines (E1, E2) are proposed. The motor vehicle has a transmission (G) with two power paths (LP1, LP2) controllable independently of one another. Each power path (LP1, LP2) is coupled via a respective epicyclic gear (P1, P2) to one of the electrical machines (LP1, LP2) and to the input shaft (KW) of the transmission (G) and can be coupled via shiftable gears (1, 2, 3, 4, 5, 6, R) to the output shaft (AW) of the transmission (G). The object is to make it possible to operate the motor vehicle more efficiently. To reduce circulating mechanical power flow between the two power paths (LP1, LP2), particularly in the boost mode or upon recuperation of braking energy, the gear combination (1, 2, 3, 4, 5, 6, R) is varied, or the engine rpm is lowered, or only one electrical machine (E1, E2) is used as a generator. More-comfortable operation is additionally achieved in that upon electrical starting, the engine (VM) is started simultaneously.

7 Claims, 6 Drawing Sheets

METHODS FOR OPERATING A MOTOR VEHICLE DRIVEN BY AN INTERNAL COMBUSTION ENGINE AND BY TWO ELECTRICAL MACHINES

BACKGROUND OF THE INVENTION

The invention is based on a method as generically defined by the preamble to the independent claims.

One such method is known for instance from German Patent Disclosure DE 199 03 936 A1. In this method, a motor vehicle is operated at least intermittently by an internal combustion engine and at least intermittently by at least one of two electrical machines. The motor vehicle has a transmission, with an input shaft, an output shaft, and two independently controllable power paths. Each power path is coupled to one of the two electrical machines and to the input shaft via a respective epicyclic gear and can be coupled to the output shaft via shiftable gears. If one gear is selected in each power path, then power can be transmitted to the output shaft simultaneously over both power paths.

This method has the advantage that with a transmission of relatively simple mechanical construction, good efficiency can be achieved. However, the possibility exists that a circulating mechanical power flow can arise in the power paths. Moreover, upon startup or starting of the internal combustion engine, one additional gear must first be selected, which at that instant in the affected power path causes an interruption in the tractive force. Then the engine brake must also be released. Both situations involve losses, which reduce the efficiency.

SUMMARY OF THE INVENTION

The object of the invention is to refine the known method such that more-efficient operation of a motor vehicle is possible. This object is attained by the characteristics of the independent claims.

The methods of the invention having the definitive characteristics of the bodies of the independent claims have the advantage that compared to the known method, still more-efficient operation is possible, because on the one hand a circulating mechanical power flow in the transmission is at least reduced; on the other, there is no interruption of tractive force from selection of a gear. The power of the engine can already be made available upon startup. Moreover, bucking of the motor vehicle upon selection of a gear is precluded from occurring. Furthermore, an engine brake can be dispensed with.

To detect the circulating mechanical power, the torques generated by the engine and by the electrical machines can be ascertained and evaluated. It is also possible, as an alternative or in addition, to compare the torques and their signs with one another. This detection can be done with the data known from the control units.

In an especially simple possibility of electrical startup or starting of the engine is, with gears selected in both power paths, simply to reverse the torque of one electrical machine, or to increase the torque of one electrical machine and reduce the torque of the other electrical machine. Moreover, there is no interruption in tractive force upon starting of the engine.

Starting up electrically with two forward gears that are far apart from one another and are disposed each in different power paths, there is the advantage that even at low vehicle speeds, the electrical machines can be operated at a favorable rpm and with good efficiency. Moreover, a relatively wide gear ratio range is covered with this gear combination, and at the same time engine starting from the electrical driving mode is made possible. The gear ratio range covered is especially wide if the startup is done with first gear and the highest gear, in particular sixth gear.

If electrical starting is done with reverse gear in one power path and second gear in the other power path, then vibration especially upon engine starting is well damped. This effect is improved still further if the amount of the gear ratio of reverse gear is equal to the amount of the gear ratio of second gear.

If no generation of electrical energy is desired or possible, for instance because the battery is full, then one electrical machine is operated as a generator, which feeds the energy it generates into the other electrical machine—which is operated as a motor.

Further advantages and advantageous refinements of the methods of the invention will become apparent from the dependent claims and the description.

One exemplary embodiment of the invention is shown in the drawing and described in further detail in the ensuing description. Shown are

DETAILED DESCRIPTION OF THE PREFERRED EMBODIMENTS

Figure 1:
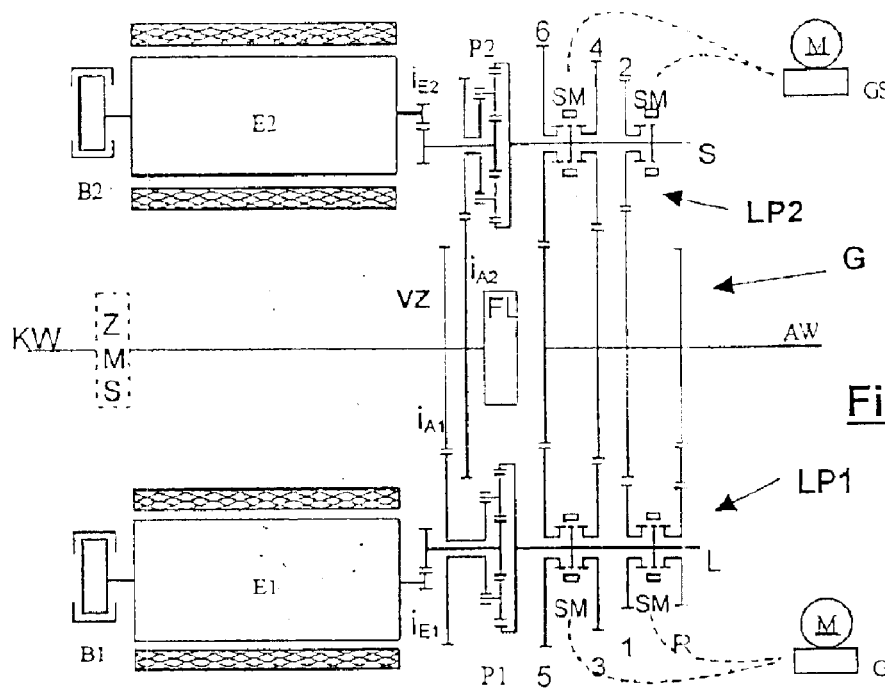
FIG. 1, an elevation view of a transmission.

In FIG. 1, part of a drive train of a motor vehicle, in particular a transmission G, is shown, of the kind already known from DE 199 03 936 A1. Here, the planet wheels of two planetary gears P1 and P2 are driven by a crankshaft KW or input shaft, driven by the internal combustion engine VM (FIG. 2), via a two-mass flywheel ZMS and via two gear ratios $i_{A1}$ and $i_{A2}$ of a branching point VZ. Instead of the planetary gears P1 and P2, other epicyclic gears can also be used, such as friction wheel epicyclic gears. The planetary gears P1, P2 are more suitable, however, because of their efficiency. The two-mass flywheel ZMS brings about a reduction in the excitation of vibration in the transmission G from the engine VM.

Two electrical machines E1 and E2 are connected to the sun wheels of the corresponding planetary gears P1 and P2 via the gear ratios $i_{E1}$ and $i_{E2}$. The electrical machines E1, E2, which are connected both to one another, for instance via an electrical intermediate circuit, and to the battery of the motor vehicle, are equipped with power electronics for four-quadrant operation.

The transmission G has two power paths LP1, LP2, controllable separately via the electrical machines E1, E2. These power paths are constructed as follows: The ring gears of the planetary gears P1, P2 are connected to two reduction gears S and L, which by means of sliding sleeves SM actuated by transmission actuators GS, the transmission actuators GS being driven by motors M, can be connected to gear wheels of the gears R, 1, 3, 5 and 2, 4, 6, respectively. R stands for reverse gear; gears 1–6 are the forward gears. The gear wheels of gears 1–6 and R mesh with corresponding counterpart gear wheels on the output shaft AW. In operation, one gear R, 1, 3 or 5 and 2, 4 or 6, respectively, in each reduction gear S, L is selected. The distribution of the torque to the two shafts S, L is done in a known way by triggering of the electrical machines E1 and E2.

Naturally still other variant arrangements of the planetary gears P1, P2 are conceivable as well. For example, coupling the power of the internal combustion engine via the respective ring gears, or uncoupling the power from the reduction gears via the respective ribs can be named.

Figure 2:
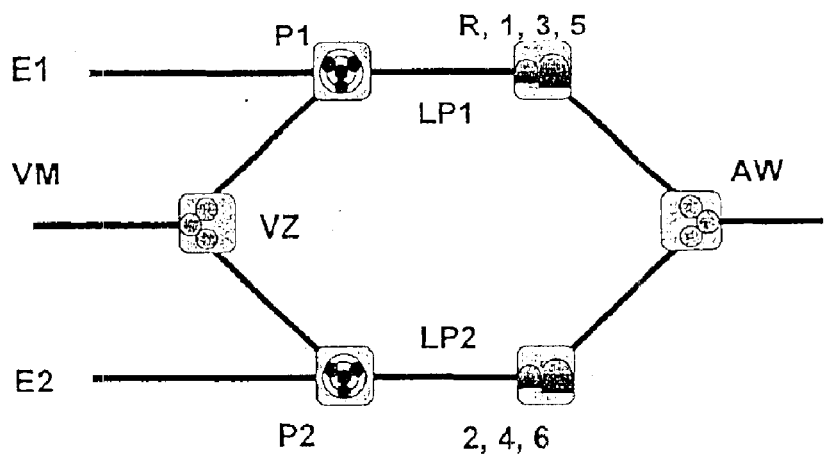
FIG. 2, the topology of the transmission of FIG. 1.

The simplified view in FIG. 2 shows the topology of the transmission G. The transmission G has two independently controllable power paths LP1 and LP2; each power path LP1, LP2 is coupled via a respective epicyclic gear (planetary gear P1, P2) to one of the electrical machines E1, E2 and to the input shaft (crankshaft KW) of the transmission G and can be coupled via shiftable gears (gears R and 1–6) to the output shaft AW of the transmission G, and power can be transmitted simultaneously over both power paths LP1, LP2. The type of power transmission is affected by the engine VM and by the electrical machines E1, E2.

Figures 3A, 3B, 3C:
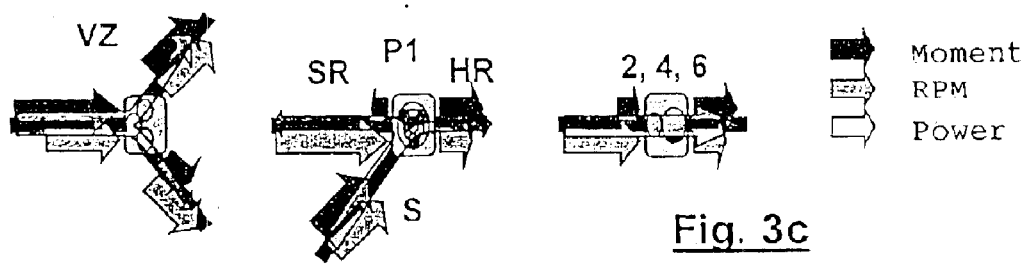
FIG. 3, the function of the basic elements of the transmission.

The arrows shown in FIGS. 3a–3c indicate the moment, the rpm, and the power, which is proportional to the product of the moment and rpm, refer to the individual transmission elements.

In FIG. 3a, which shows the branching point VZ from one to two shafts, the power flow from one to two shafts can be seen. The ratios of the rotary speeds to one another remain the same, and the torques are divided, so that the sum must necessarily be zero.

From FIG. 3b, the power flow via a planetary gear P1 or P2 can be seen. Two rotary speeds can be selected arbitrarily, and the third rotary speed is dependent on that; the rpm of the rib is a weighted average of the two other rotary speeds. All the torques are divided at a fixed ratio or are in a fixed ratio to one another, which is dependent on the number of teeth.

FIG. 3c shows the power flow at a gear ratio of the gears 1–6 or R. The rotary speed and the torque are converted at a ratio that depends on the number of teeth; for reverse gear R, the direction of torque and moment changes as well. The transmitted power, as a product of the rotary speed and the moment, remains constant.

Figure 4:
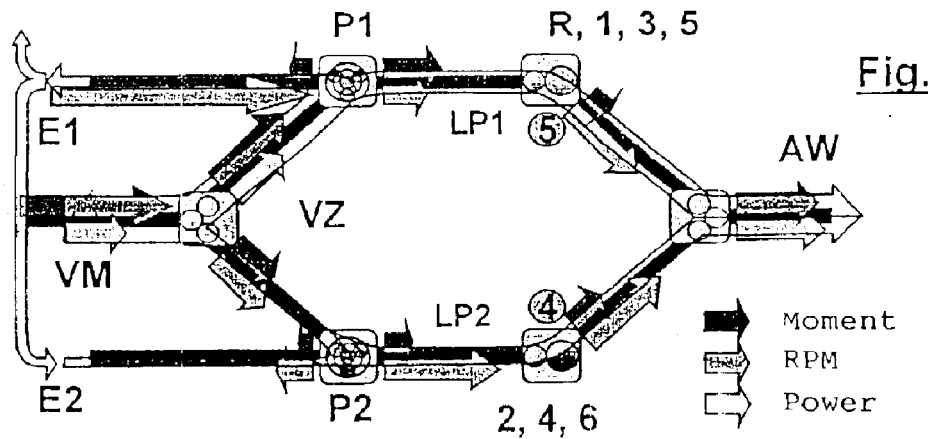
FIG. 4, the power flow in the transmission in stationary operation.

FIG. 4 shows the power flow in the transmission G in stationary operation. The power flows from the engine VM via the crankshaft KW, is divided via the shafts S and L and via the gears 1–6 and R and thus via the two power paths LP1, LP2, and is transmitted to the output shaft AW. A small portion flows via the electrical machines E1, E2; some of it is diverted for the on-board electrical system and for electrical losses. If one electrical machine E1 or E2 is free of moment, the other supports the full moment, and the power flows over only one power path LP1 or LP2. This is true for both power paths LP1, LP2. All the gear ratios between these two states can be represented in a continuously variable way.

Figure 5:
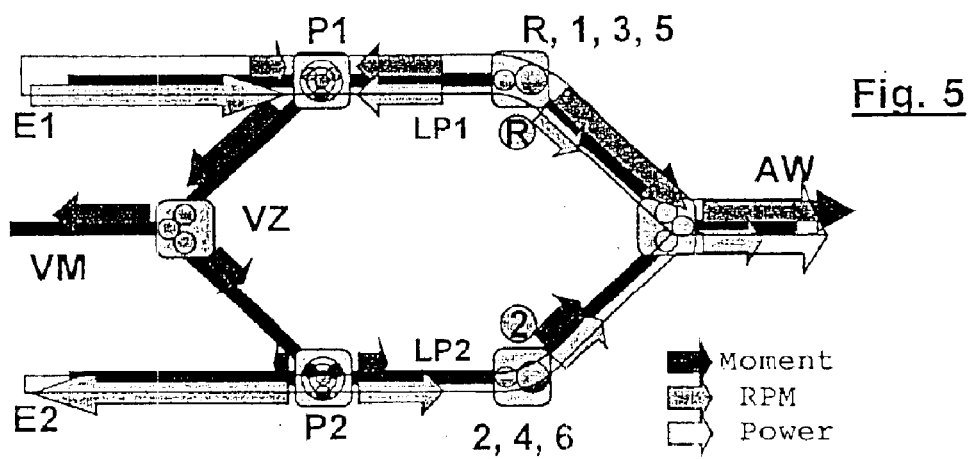
FIG. 5, the power flow upon electrical startup with gears R and 2 at the instant of engine starting.

In FIG. 5, the power flow is shown upon electrical startup, with the gears R and 2 already selected, at the moment of engine starting. The torque of the electrical machine E1 of the gear shaft S in the power path LP1 in which reverse gear R has been selected is increased, while that of the other electrical machine E2 is decreased accordingly. Thus the torque at the output shaft AW remains the same. Because of the unevenly divided torques, an additional moment on the crankshaft KW is created, which starts the engine VM.

Figure 6:
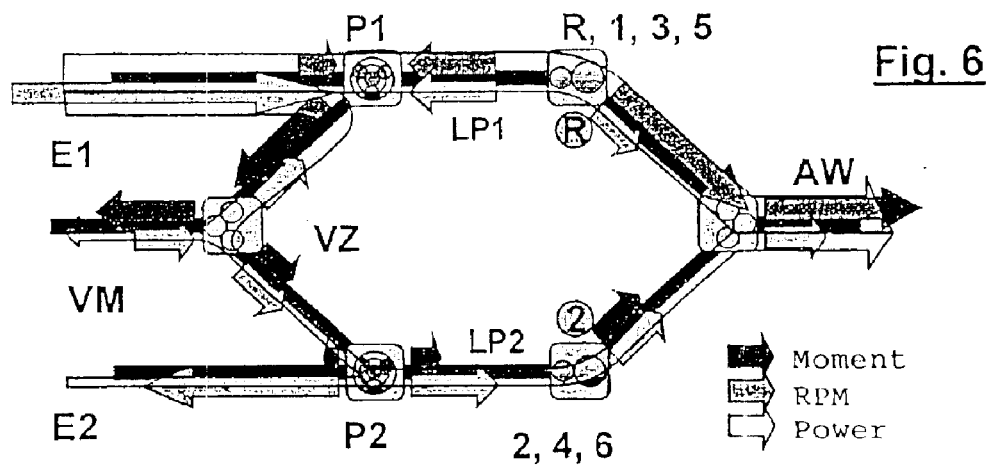
FIG. 6, the power flow upon electrical startup with gears R and 2 during engine starting.

In FIG. 6, the power flow is shown upon electrical startup with gears R and 2 during engine starting. At this moment, the engine is already turning over, but ignition has not yet occurred. The electrical machine E1 must produce high power then, in order simultaneously to drive the motor vehicle and to start the engine VM. As a rule, this can be done successfully in warm starting and at low power takeoff levels. For example if 5 kW are needed upon starting of the engine VM, then the electrical machine E1, at a maximum of 10 kW of transient power, can still furnish 5 kW for the power takeoff. In addition, 1 kW, for example, is furnished by the electrical machine E2, so that 6 kW at the power takeoff are possible.

This method, in which the engine VM is started immediately after the electrical startup, has the advantage that even during the process of starting the engine, a power takeoff level is available at the wheel and can be used to accelerate the vehicle. This is used, particularly in stop and go operation of the vehicle, to increase comfort, since as soon as the condition is tripped the driver can start up for starting the engine. The fact that reverse gear R disposed in one power path LP1 and second gear disposed in the other power path LP2 have been selected has a favorable effect on vibration, because of the contrary rotation of the power paths LP1 and LP2. This effect is improved further if the value of the gear ratio of reverse gear is equal to the value of the gear ratio of second gear, but the two gears R and 2 have opposite signs.

Figure 7:
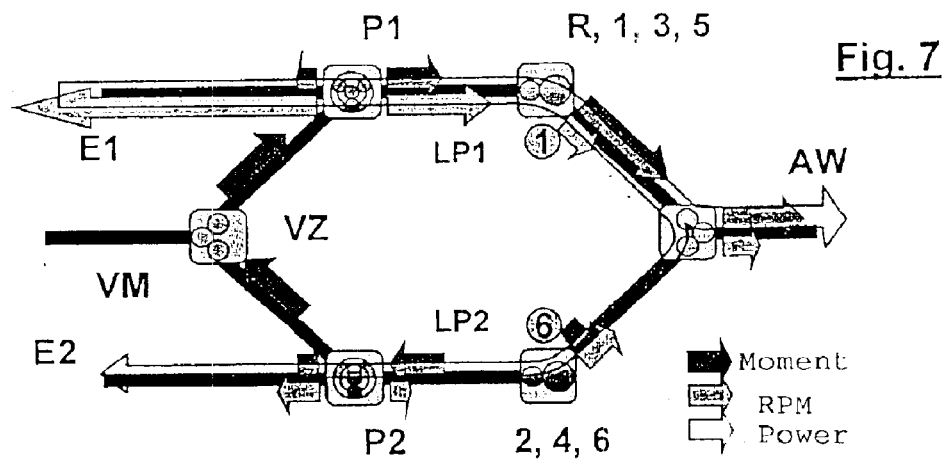
FIG. 7, the power flow upon electrical startup with gears 1 and 6 just before engine starting.

From FIG. 7, the power flow can be seen upon electrical startup, with first and sixth gears already selected, shortly before engine starting. In electrical startup with first and sixth gears, the electrical machine E1 acts as a motor. Its torque is boosted twice at the planetary gear P1 and at first gear. The second electrical machine E2 withstands the reaction moment on the crankshaft KW. The result is a reversed power flow in the power path LP2, and the second electrical machine E2 acts as a generator. Because of the gear ratio of sixth gear, the rotary speeds and thus the power levels in this power path LP2 remain low.

Figure 8:
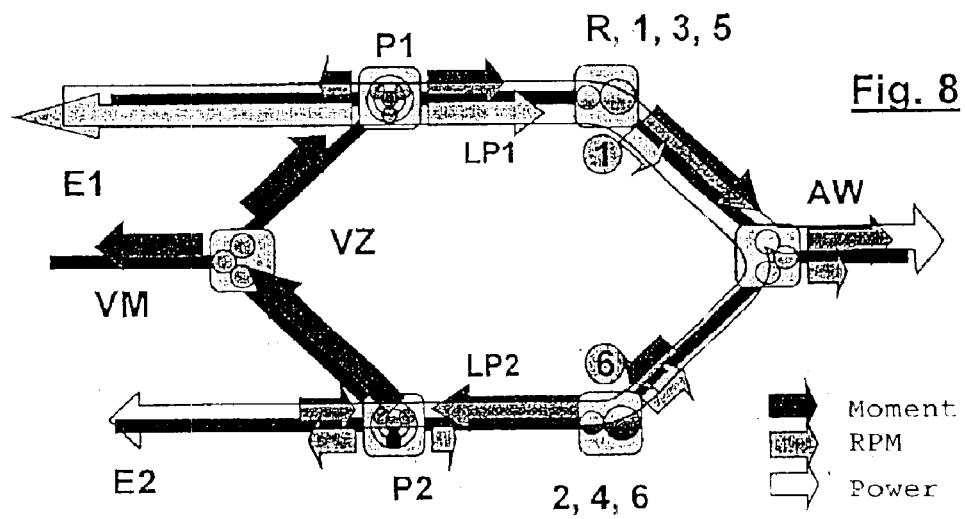
FIG. 8, the power flow upon electrical startup with gears 1 and 6 at the instant of engine starting.

In FIG. 8, the power flow upon engine starting is shown. Here, the vehicle starts up electrically with first and sixth gears. To initiate the starting of the internal combustion engine VM, the moment equilibrium between the electrical machines E1 and E2 is cancelled. The moment of the electrical machine E2 is increased markedly, while that of the electrical machine E1 is increased only slightly. Thus the power takeoff moment remains constant; the power flow in the transmission G increases; and at the crankshaft KW, a torque is present that leads to engine starting.

Figure 9:
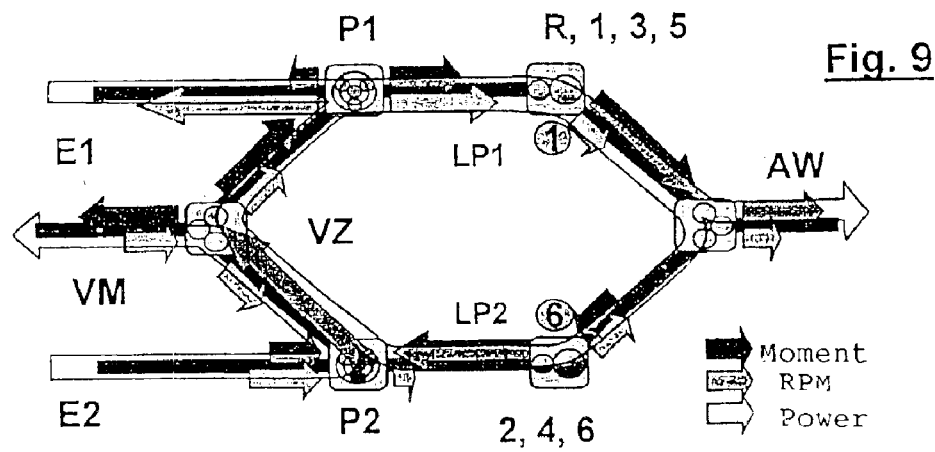
FIG. 9, the power flow upon electrical startup with gears 1 and 6 during engine starting.

In FIG. 9, the power flow can be seen shortly after engine starting. The engine VM already has a rotary speed but ignition has not yet occurred. The rotary speeds and thus the power flow now change considerably. The rotary speed and motor output of the electrical machine E1 decrease slightly; the electrical machine E2 changes its direction of rotation and changes from operation as a generator to operation as a motor. Power circulates in the transmission G. The power flow is supplied from both electrical machines E1, E2. The engine VM and the output shaft AW are sinks for the power.

If—depending on the driver demand and vehicle and/or environmental status—starting is either done electrically and/or the engine VM is started, it is accordingly important that with gears selected in both power paths, the torque of at least one electrical machine E1, E2 is varied. Concretely, this can be done such that the torque or direction of the torque of one electrical machine E1, E2 is reversed, or that the torque of one electrical machine E1, E2 is increased while the torque of the other electrical machine E1, E2 is reduced. Under certain circumstances, a variably pronounced increase in both torques is also conceivable. These methods have the advantage of being simple to control, since only the electrical machines E1, E2 have to be triggered accordingly. Moreover, an interruption in tractive force in one of the two power paths LP1, LP2 is avoided. This results not only in increased efficiency but also in increased comfort, since upon startup the motor vehicle has less tendency to bucking.

Figure 10:
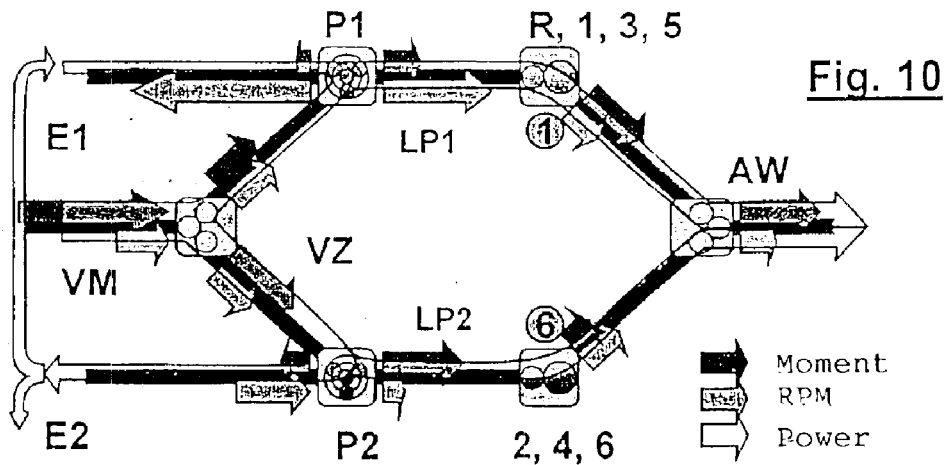
FIG. 10, the power flow in stationary operation with gears 1 and 6.

In FIG. 10, the power flow in stationary operation is shown with first and sixth gears. After the end of the starting process, ignition of the engine VM has occurred, and the engine produces torque and power. The torques and the power flow change. Immediately and without further shifting, a typical operating state with the paired gears 1 and 6 ensues. The pairing of first and sixth gears is highly suitable for low vehicle speeds, among other purposes. The electrical machines E1, E2 then have favorable operating rotary speeds. By controlling the moment flow, it is possible to adjust all the gear ratios between first and sixth gears in a continuously variable manner. Depending on what is required, for instance if the vehicle speed or load is increasing, this gear combination can be replaced by first and second gears, first and fourth gears, third and sixth gears, or fifth and sixth gears, for instance.

What is critical here is accordingly that the startup is done electrically, with two forward gears 1 and 6, disposed in the power paths LP1, LP2 and located far apart and each in different power paths LP1, LP2. As a result, a relatively wide vehicle speed range can be covered, and a relatively high starting moment for the engine can be achieved. This becomes especially favorable if starting up is done with first gear and the highest gear, in particular as in this case with sixth gear.

Figure 11:
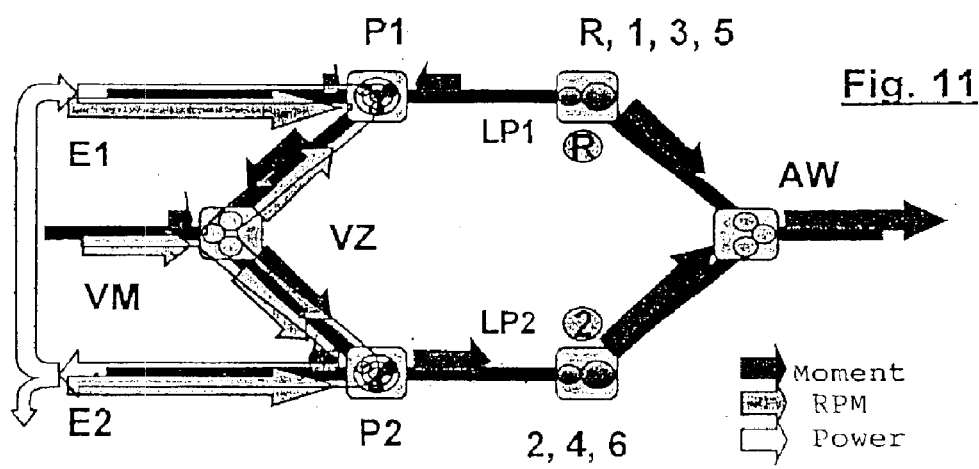
FIG. 11, the power flow upon startup without battery input.

In FIG. 11, the power flow upon startup with the aid of the engine VM without battery input is shown. This is required for instance if the battery is fully charged and no further load is to be put on it. Then one electrical machine E2 is operated as a generator, and one electrical machine E1 is operated as a motor. For that purpose, the gears R and 2 are for instance selected. With the engine VM running and the electrical machines E1, E2 rotating, two differently oriented torques are now established at the electrical machines E1, E2. The electrical machine E1 in the power path LP1 with reverse gear R acts as a motor. The electrical machine E2 in the power path LP2 that has second gear acts as a generator. The resultant electrical power is supplied again (minus losses or on-board electrical system requirements) to the electrical machine E1 acting as a motor, so that the battery is not involved. Because of the reversal of the direction at reverse gear R, the torques at the output shaft AW add up again. As long as the motor vehicle is stopped, the engine VM need merely compensate for the power loss and therefore produces only slight moments.

Figure 12:
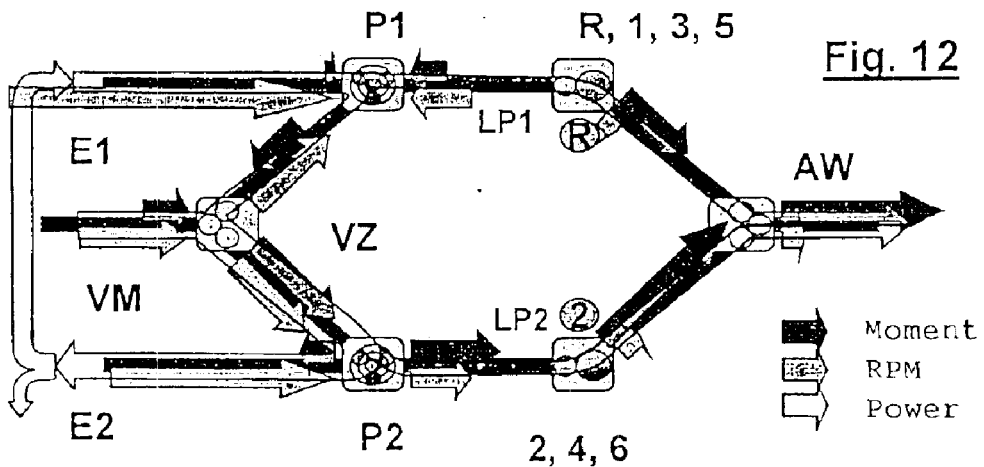
FIG. 12, the power flow shortly after the electrical startup without battery input.

In FIG. 12, the power flow is shown shortly before startup without battery input. If the motor vehicle begins to move, power flows to the output shaft AW. If the engine rpm remains constant, the rotary speeds of the two electrical machines E1, E2 increase and decrease, and thus so do the moments that can be transmitted for the same electrical power. The power of the engine VM then increases, and the additional power flows to the output shaft AW. As operation continues, the power path LP1 becomes completely moment-free; reverse gear R is then shifted out of and replaced with a forward gear (typically third gear, but first or fifth gear is also possible). The mode of operation changes over to the standard situation for stationary operation.

An advantage of the gear combination R and 2 is in particular the possibility upon startup of avoiding or at least diminishing both an increased burden on the on-board electrical system and a circulating mechanical power in the transmission G.

Figure 13:
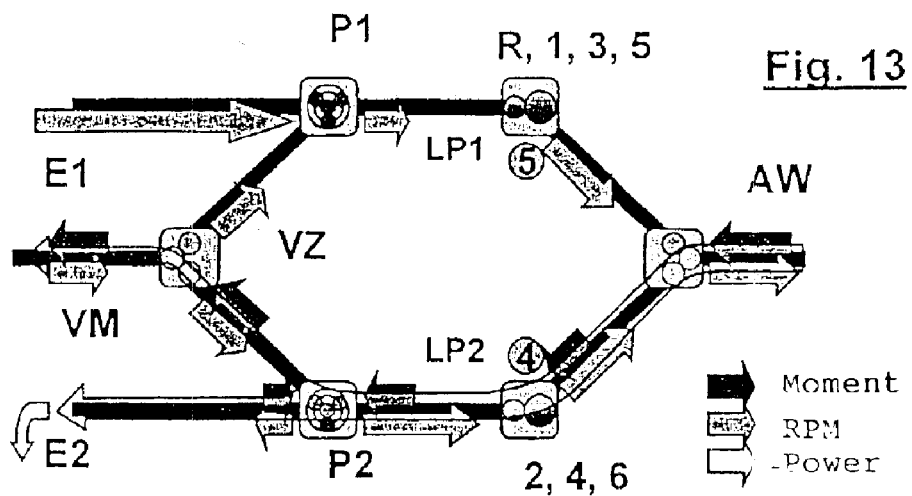
FIG. 13, the power flow upon recuperation of braking energy with the dragging mode of the engine.

In FIG. 13, the power flow is shown upon recuperation of braking energy in the dragging mode of the engine VM. For the recuperation, in the simplest case, the torques at the engine VM and at the output shaft AW are reversed. The power takeoff is then braked and the engine VM is dragged. As a result, the electrical machines E1, E2 also exchange roles as a motor and generator. To avoid or diminish a circulating mechanical power, only the electrical machine E2 acting as a generator is triggered. The other electrical machine E1 runs with it, without a load.

In this operating state, the power flows from the output shaft AW to the engine VM and to the electrical machine E2. That is, the engine VM can be put into the overrunning mode, in which no fuel is consumed. In this operating state, lesser recuperation power levels with high efficiency can be achieved. Shifting is unnecessary to change over from the normal driving mode into this operating mode. For avoiding or diminishing circulating mechanical power between the two power paths, particularly upon the recuperation of braking energy, it is advantageous to use only one electrical machine as a generator.

Figure 14:
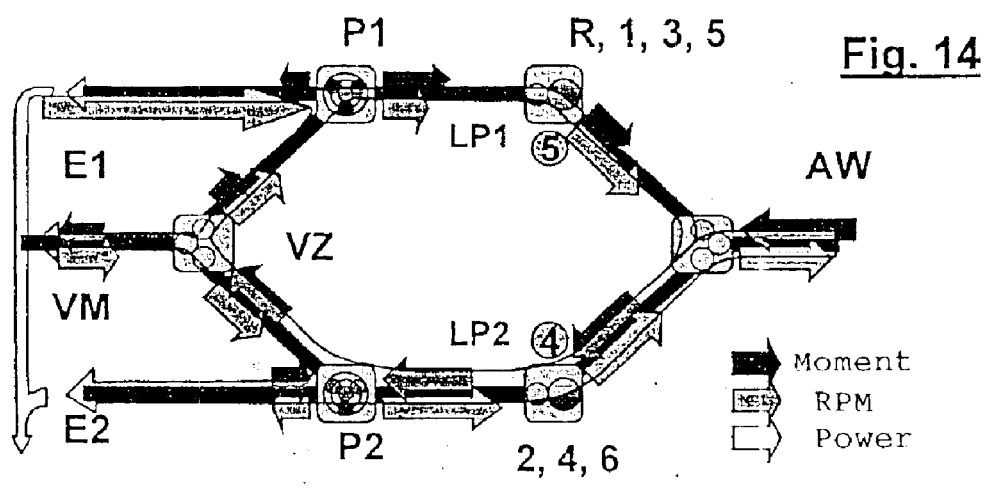
FIG. 14, the power flow upon recuperation of braking energy with the dragging mode of the engine with circulating power flow.

In FIG. 14, in contrast to FIG. 13, a circulating mechanical power between the two power paths LP1, LP2 upon recuperation of braking energy in the dragging mode of the engine VM is shown. This occurs at relatively high recuperation power levels. In this case, the other electrical machine E1 is added as a generator. At the power takeoff, a higher braking moment can be generated, and more total current can be generated at two electrical machines E1, E2. This situation can also be reached directly from the driving mode, without an additional shifting operation. However, the result is the circulating mechanical power, which means poorer mechanical efficiency of the transmission.

Figure 15:
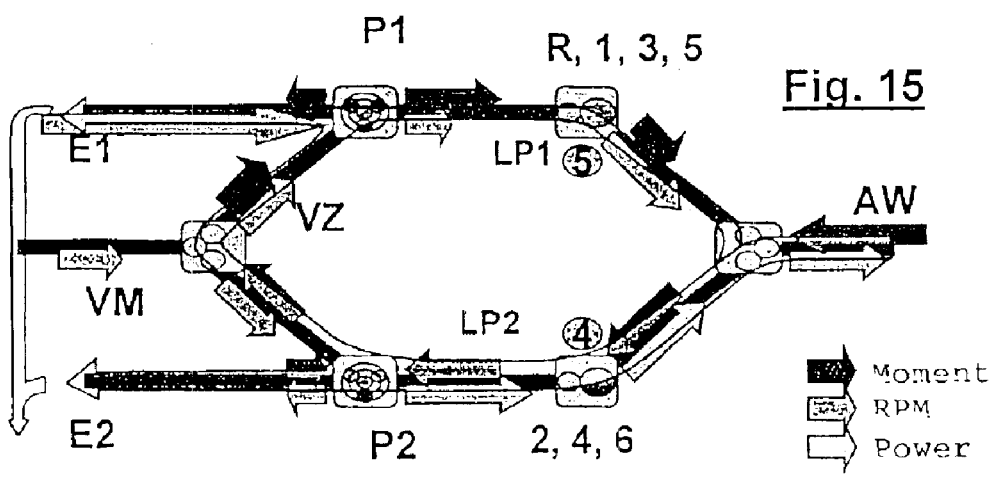
FIG. 15, the power flow upon recuperation of braking energy without the dragging mode of the engine.

In FIG. 15, the power flow is shown upon recuperation of braking energy without a dragging mode of the engine. By means of a suitable regulation of the electrical machines E1, E2, it is also possible in this operating state to completely circumvent the dragging mode of the engine VM. In that case, the torques that act from the two power paths LP1, LP2 on the crankshaft KW cancel one another out. In this operating state, the idling governor of the engine VM must keep the engine at its rotary speed. To that end, the idling consumption at the applicable rpm must be brought to bear. The operating state is therefore especially appropriate if the braking power at the transmission output that the driver is demanding is inadequate to produce the drag power of the engine VM at its lowest possible operating rpm.

Figure 16:
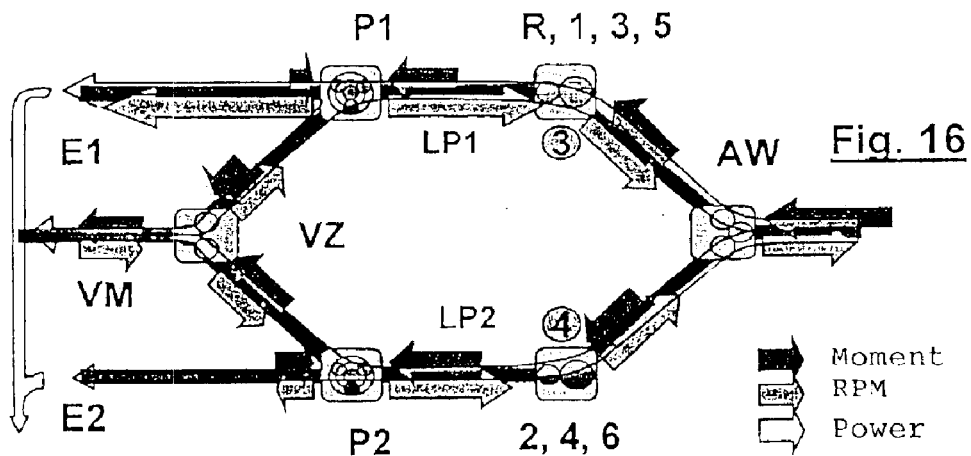
FIG. 16, the power flow upon recuperation of braking energy without a circulating power flow.

In FIG. 16, the power flow is shown upon recuperation of braking energy without circulating power flow. To circumvent the circulating power flow in the transmission G, different rpm conditions can be established by means of shifting. The power flow can thus be directed differently. This is preferably performed whenever relatively long recuperation phases are expected, such as when driving some distance uphill or downhill. In that situation, the shifting has especially high usefulness because of the improvement in the mechanical efficiency of the transmission. At the same time, the shifting preselects a gear combination for normal driving operation at a slower speed, which typically occurs after the recuperation operation.

Figure 17:
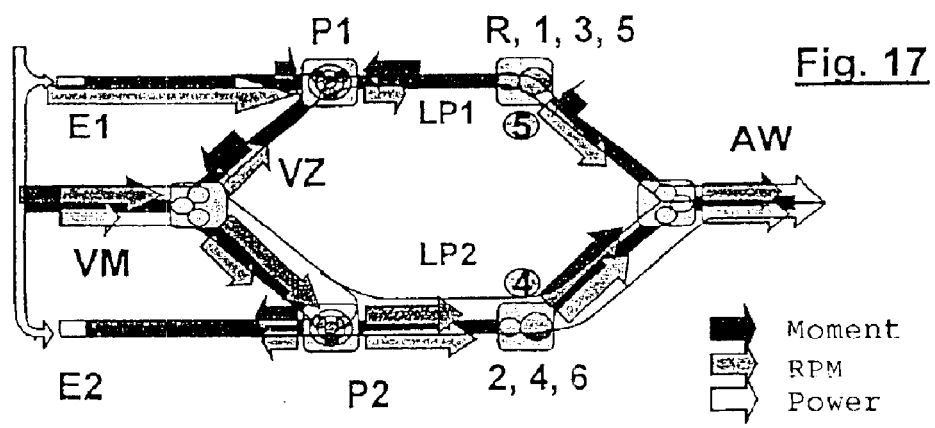
FIG. 17, the power flow in the boost mode with a circulating power flow.

Analogously to the recuperation, in FIG. 17 a boost mode can also be realized. Here both the engine VM and both electrical machines E1, E2 are used for driving. However, the consequence is a circulating mechanical power, which leads to poorer transmission efficiency. On the other hand, a high additional power into the drive train is achieved.

Figure 18:
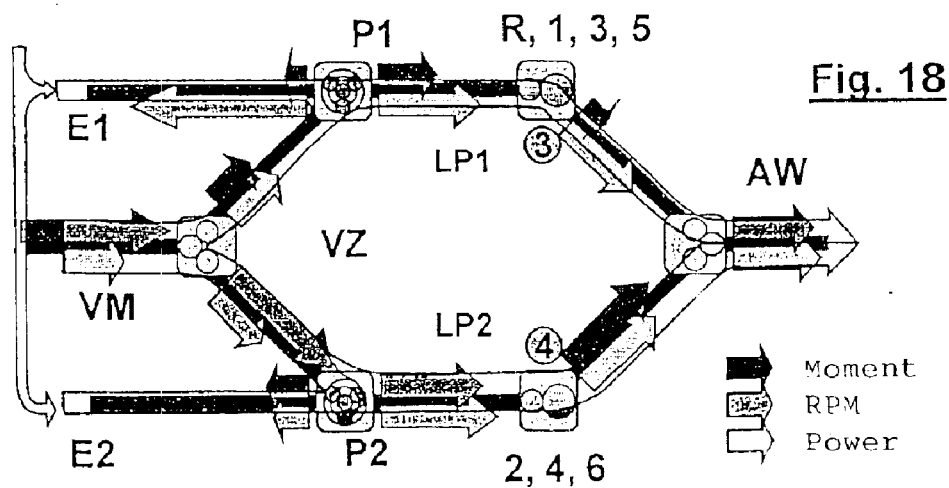
FIG. 18, the power flow in the boost mode without a circulating power flow.

To avoid the circulating power flow, in FIG. 18 a different gear combination can be selected in the boost mode as well. The requisite shifting operation is equivalent to downshifting, which is also necessary for conventional transmissions when there is a high power demand. Alternatively, lowering the rpm of the engine VM while the vehicle speed remains constant is also possible. This is equivalent to a change in the total gear ratio of the engine/transmission output, for gear stages that remain the same. However, the higher power demand in the boost mode is in contradiction to this.

To diminish or avoid circulating power flow between the two power paths LP1, LP2, particularly in the boost mode or in the recuperation of braking energy, the gear ratio combination or the engine rpm can be varied, and in particular lowered, or only one electrical machine E1, E2 can be used as a generator or motor.

For detecting the circulating power, the torques generated by the engine VM and the electrical machines E1, E2 can be evaluated along with their rotary speeds. The torques can be ascertained from the existing control unit or units of the engine VM and of the electrical machines E1, E2. By comparing the torque with set-point values, which are available for instance in tables, it can be determined whether mechanical power is being lost from circulation between the two power paths LP1, LP2. Alternatively or in addition, the existence of a circulating mechanical power can advantageously also be checked by evaluating the sign of the torques, since the signs are also an indicator of circulating mechanical power. The magnitude of the circulating power flow can be calculated by taking into account the rotary speeds of the engine VM and electrical machines E1, E2. A shifting operation, a change in particular reduction in the engine rpm, or the use of only one electrical machine E1, E2 as a generator can be made dependent on this.

What is claimed is:

1. A method for operating a motor vehicle that is driven at least intermittently by an internal combustion engine (VM) and at least intermittently by at least one of two electrical machines (E1, E2), which has a transmission (G) with two power paths (LP1, LP2) that are controllable independently of one another, each power path (LP1, LP2) being coupled via a respective epicyclic gear (P1, P2) to one of the electrical machines (LP1, LP2) and to an input shaft (KW) of the transmission (G) and being couplable to an output shaft (AW) of the transmission (G) via shiftable gears (1, 2, 3, 4, 5, 6, R), power being transmissible simultaneously over power paths (LP1, LP2), wherein at least to reduce circulating mechanical power flow between the two power paths (LP1, LP2), a gear combination (1, 2, 3, 4, 5, 6, R) or the engine rpm is varied, or only one electrical machine (E1, E2) is used as a generator.

2. The method of claim 1, wherein to detect the circulating mechanical power, torques generated by the engine (VM) and by the electrical machines (E1, E2) are ascertained and compared with predetermined set-point values.

3. The method of claim 1, wherein to detect the circulating mechanical power, a sign of the torques generated by the engine (VM) and the electrical machines (E1, E2) are compared with one another.

4. A transmission for performing the method of claim 1, wherein one electrical machine (E1, E2) is operated as a generator, and the other electrical machine (E1, E2) is operated as a motor.

5. The transmission for performing the method of claim 1, wherein an amount of a gear ratio of reverse gear (R) is equal to an amount of a step-up of second gear (2), and the two gears (R, 2) have opposite signs.

6. A method for operating a motor vehicle that is driven at least intermittently by an internal combustion engine (VM) and at least intermittently by at least one of two electrical machines (E1, E2), which has a transmission (G) with two power paths (LP1, LP2) that are controllable independently of one another, each power path (LP1, LP2) being coupled via a respective epicyclic gear (P1, P2) to one of the electrical machines (LP1, LP2) and to the input shaft (KW) of the transmission (G) and being couplable to the output shaft (AW) of the transmission (G) via shiftable gears (1, 2, 3, 4, 5, 6, R), power being transmissible simultaneously over both power paths (LP1, LP2), wherein for electrical startup and/or for starting the engine (VM) with gears (1, 2, 3, 4, 5, 6, R) selected in both power paths, the torque of at least one electrical machine (E1, E2) is varied as a function of a driver demand, vehicle, and/or environment status, wherein the torque of the one electrical machine (E1, E2) is increased, and the torque of the other electrical machine (E1, E2) is reduced.

7. The method of claim 6, wherein with two forward gears (1, 6) disposed on the power paths (LP1, LP2), wherein the forward gears are as far as apart as possible and are each disposed in different power paths (LP1, LP2), electrical starting is done or the engine (VM) is started.

* * * * *